United States Patent
Supnet

(10) Patent No.: US 6,868,484 B2
(45) Date of Patent: *Mar. 15, 2005

(54) REPLACEMENT DATA ERROR DETECTOR

(75) Inventor: Erik P. Supnet, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/411,589

(22) Filed: Apr. 10, 2003

(65) Prior Publication Data

US 2003/0191898 A1 Oct. 9, 2003

Related U.S. Application Data

(63) Continuation of application No. 09/847,174, filed on May 1, 2001, now Pat. No. 6,571,317.

(51) Int. Cl.$^7$ .............................................. G06F 12/00
(52) U.S. Cl. ...................... 711/133; 711/118; 711/128; 711/134; 711/159; 714/6; 714/48; 714/49; 714/52
(58) Field of Search ................................ 711/118, 128, 711/133, 134, 159, 136; 714/6, 48, 49, 52

(56) References Cited

U.S. PATENT DOCUMENTS

| | | | | |
|---|---|---|---|---|
| 3,958,228 A | * | 5/1976 | Coombes et al. | 714/25 |
| 4,507,729 A | * | 3/1985 | Takahashi et al. | 714/48 |
| 4,912,712 A | * | 3/1990 | Yamada | 714/812 |
| 4,967,414 A | * | 10/1990 | Lusch et al. | 714/45 |
| 5,283,876 A | | 2/1994 | Tague | |
| 5,537,570 A | | 7/1996 | Tran | |
| 5,588,112 A | | 12/1996 | Dearth et al. | |
| 5,829,024 A | | 10/1998 | Sato | |
| 5,978,952 A | | 11/1999 | Hayek et al. | |
| 5,987,585 A | | 11/1999 | Motoyama et al. | |
| 6,101,614 A | | 8/2000 | Gonzales et al. | |
| 6,108,753 A | | 8/2000 | Bossen et al. | |
| 6,145,057 A | | 11/2000 | Arimilli et al. | |
| 6,546,501 B1 | * | 4/2003 | Hataida et al. | 714/6 |
| 6,571,317 B2 | | 5/2003 | Supnet | 711/133 |
| 6,708,294 B1 | * | 3/2004 | Nakao et al. | 714/42 |

FOREIGN PATENT DOCUMENTS

| | | |
|---|---|---|
| EP | 0 377 164 A | 7/1990 |
| EP | 0 706 128 A | 4/1996 |
| EP | 02253079.4 | 7/2004 |
| WO | WO 98/18108 A | 4/1998 |

OTHER PUBLICATIONS

Tom R. Halfhill, "SiByte Reveals 64–Bit Core For NPUs; Independent MIPS64 Design Combines Low Power, High Performance," Microdesign Resources, Jun. 2000, Microprocessor Report, 4 pages.

(List continued on next page.)

Primary Examiner—Donald Sparks
Assistant Examiner—Ngoc Dinh
(74) Attorney, Agent, or Firm—Garlick Harrison & Markison LLP

(57) ABSTRACT

A cache includes an error circuit for detecting errors in the replacement data. If an error is detected, the cache may update the replacement data to eliminate the error. For example, a predetermined, fixed value may be used for the update of the replacement data. Each of the cache entries corresponding to the replacement data may be represented in the fixed value. In one embodiment, the error circuit may detect errors in the replacement data using only the replacement data (e.g. no parity or ECC information may be used). In this manner, errors may be detected even in the presence of multiple bit errors which may not be detectable using parity/ECC checking.

17 Claims, 6 Drawing Sheets

OTHER PUBLICATIONS

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB–1 CPU, Oct. 2000, rev. 0.1, 1 page.

SiByte, "Fact Sheet," SB–1250, Oct. 2000, rev. 0.2, 10 pages.

Stepanian, SiByte, SiByte SB–1 MIPS64 CPU Core, Embedded Processor Forum 2000, Jun. 13, 2000, 15 pages.

Jim Keller, "The Mercurian Processor: A High Performance, Power–Efficient CMP for Networking," Oct. 10, 2000, 22 pages.

Patterson and Hennessy, "Computer Architecture A Quantitative Approach," Second Edition, 1996 Morgan Kaufmann Publishers, Inc., 3 pages.

* cited by examiner

REPLACEMENT DATA ERROR DETECTOR

This application is a continuation of U.S. patent application Ser. No. 09/847,174 filed May 1, 2001 now U.S. Pat. No. 6,541,317.

BACKGROUND OF THE INVENTION

1. Field of the Invention

This invention is related to the field of caches and, more particularly, to error checking of replacement data used with caches.

2. Description of the Related Art

Memories may generally be subject to both hard errors and soft errors. Hard errors occur when a memory storage cell or cells has failed such that the cell or cells do not actually store values any longer. Thus, a value written to the memory cell or cells may not be read from the memory cell or cells regardless of the amount of time between the write and the read or the presence/absence of other activity in or near the memory between the write and the read. Soft errors occur if the memory cell or cells have not failed, but some external event (e.g. noise from surrounding circuitry) or some natural phenomena (such as charge leakage from dynamic random access memories, or DRAMs) has changed the value stored in the memory cell or cells between the write and the read. In either case, the value read from the memory may not be the value expected in view of the preceding write.

In order to account for the possibility of error and, in some cases, recovery therefrom, various error checking and/or correction schemes have been used in the past. For example, parity checking has been used. With parity, an additional bit is stored with a value in memory. The additional bit is the exclusive-OR (or exclusive-NOR) of the bits of the value. When the value is read, the parity bit is also read and exclusive-ORed (or exclusive-NORed) with the value to detect an error. If a single bit has changed since the value and the parity bit were stored in the memory, the exclusive-OR results in a binary one and an error is detected. However, if multiple bits have changed, the changes can offset each other in the exclusive-OR and no error is detected.

Other, more elaborate error checking/correction schemes have also been used in which various overlapping subsets of the bits of a value are exclusive-ORed to produce an error checking/correction (ECC) code. Depending upon the number of bits in the ECC code as compared to the number of bits in the underlying values and further depending upon the selected overlapping subsets, enhanced error detection may be possible. Particularly, with ECC codes it may be possible not only to detect certain errors, but also to correct the data read from the memory for some errors. For example, ECC codes that allow for single bit error correction and double bit error detection are popular. However, even the ECC codes may not detect some errors (e.g. double or triple bit errors for the example above).

Cache memories may be subject to the above-mentioned errors. Cache memories generally include storage for data as well as tags identifying the address in main memory at which the cached data is stored. Furthermore, cache memories may often store replacement data used to select a cache entry for replacement when an access to the cache misses. Any of the data, tags, or replacement data may experience the above-mentioned errors.

Errors in the replacement data may impact performance. If the replacement data is in error, it is possible that one or more cache entries will never be selected for replacement (or at least will temporarily not be selected, still impacting performance). Effectively, the non-selected entries may not be used by the cache, reducing the overall effectiveness of the cache if the data currently stored therein is not being used by the device or devices served by the cache. However, the error detection schemes described above generally are not capable of detecting all possible errors in the replacement data. Furthermore, since the replacement data may frequently include relatively few bits, storing parity or ECC bits corresponding to the replacement data alone may be inefficient. Frequently, other data (e.g. the tags) may be grouped with the replacement data and error detection data (e.g. ECC or parity) may be calculated for the group as a whole. For example, one or two parity bits might be used to cover the tags and the replacement data of a set in a set associative cache. Thus, detection of errors in the replacement data may be hampered by the occurrence of errors in the other data within the group.

SUMMARY OF THE INVENTION

A cache is described which includes an error circuit for detecting errors in the replacement data. If an error is detected, the cache may update the replacement data to eliminate the error. For example, a predetermined, fixed value may be used for the update of the replacement data. Each of the cache entries corresponding to the replacement data may be represented in the fixed value. By eliminating the error in the replacement data, the performance impacts of the error may be reduced.

In one embodiment, the error circuit may detect errors in the replacement data using only the replacement data (e.g. no parity or ECC information may be used). In this manner, errors may be detected even in the presence of multiple bit errors which may not be detectable using parity/ECC checking. Furthermore, inefficiency which may result if parity/ECC were used for the replacement data may be avoided, as may grouping the replacement data with other data for covering with parity/ECC data.

Broadly speaking, a cache is contemplated comprising a memory configured to store replacement data corresponding to a plurality of cache entries and a circuit coupled to receive the replacement data from the memory. The circuit is configured to determine whether or not at least one of the plurality of cache entries is not represented in the replacement data.

Additionally, a method is contemplated. Replacement data corresponding to a plurality of cache entries is received. Whether or not at least one of the plurality of cache entries is not represented in the replacement data is determined.

Furthermore, a cache is contemplated, comprising a memory configured to store replacement data corresponding to a plurality of cache entries and a circuit coupled to receive the replacement data from the memory. The replacement data indicates an order of the plurality of cache entries for replacement. The circuit is configured to detect an error in the order if a different one of the plurality of cache entries is not indicated at each position in the order.

Moreover, a cache is contemplated. The cache includes a memory configured to store replacement data corresponding to a plurality of cache entries and a circuit coupled to receive the replacement data from the memory. The circuit is configured to decode the replacement data to detect an error therein.

Still further, a cache including a memory configured to store replacement data corresponding to a plurality of cache entries and a circuit coupled to receive the replacement data from the memory is contemplated. The circuit is configured to detect an error in the replacement data using only the replacement data.

BRIEF DESCRIPTION OF THE DRAWINGS

The following detailed description makes reference to the accompanying drawings, which are now briefly described.

Figure 1:
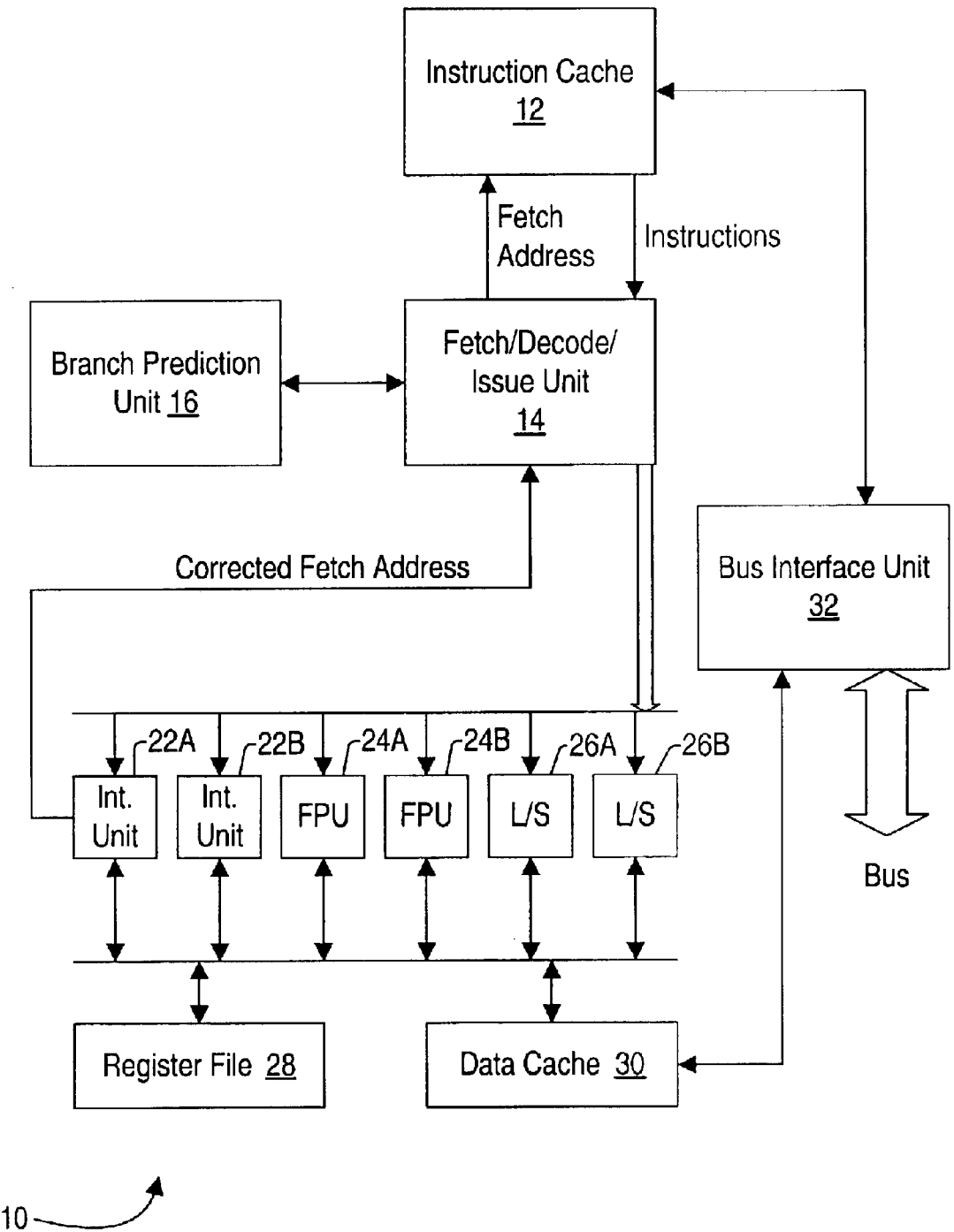
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, the processor 10 includes an instruction cache 12, a fetch/decode/issue unit 14, a branch prediction unit 16, a set of integer execution units 22A–22B, a set of floating point execution units 24A–24B, a set of load/store execution units 26A–26B, a register file 28, a data cache 30, and a bus interface unit 32. The instruction cache 12 is coupled to the bus interface unit 32, and is coupled to receive a fetch address from, and provide corresponding instructions to, the fetch/decode/issue unit 14. The fetch/decode/issue unit 14 is further coupled to the branch prediction unit 16 and the execution units 22A–22B, 24A–24B, and 26A–26B. Specifically, the fetch/decode/issue unit 14 is coupled to provide a branch address to the branch prediction unit 16 and to receive a prediction and/or a target address from the branch prediction unit 16. The fetch/decode/issue unit 14 is coupled to provide instructions for execution to the execution units 22A–22B, 24A–24B, and 26A–26B and to receive a corrected fetch address from the integer execution unit 22A. The execution units 22A–22B, 24A–24B, and 26A–26B are generally coupled to the register file 28 and the data cache 30, and the data cache 30 is coupled to the bus interface unit 32.

Generally speaking, the fetch/decode/issue unit 14 is configured to generate fetch addresses for the instruction cache 12 and to receive corresponding instructions therefrom. The fetch/decode/issue unit 14 uses branch prediction information to generate the fetch addresses, to allow for speculative fetching of instructions prior to execution of the corresponding branch instructions. Specifically, in one embodiment, the branch prediction unit 16 include an array of branch predictors indexed by the branch address (e.g. the typical two bit counters which are incremented when the corresponding branch is taken, saturating at 11 in binary, and decremented when the corresponding branch is not taken, saturating at 00 in binary, with the most significant bit indicating taken or not taken). While any size and configuration may be used, one implementation of the branch predictors 16 may be 4k entries in a direct-mapped configuration. Additionally, in one embodiment, the branch prediction unit 16 may include a branch target buffer comprising an array of branch target addresses. The target addresses may be previously generated target addresses of any type of branch, or just those of indirect branches. Again, while any configuration may be used, one implementation may provide 64 entries in the branch target buffer. Still further, an embodiment may include a return stack used to store link addresses of branch instructions which update a link resource ("branch and link" instructions). The fetch/decode/issue unit 14 may provide link addresses when branch instructions which update the link register are fetched for pushing on the return stack, and the return stack may provide the address from the top entry of the return stack as a predicted return address. While any configuration may be used, one implementation may provide 8 entries in the return stack.

The fetch/decode/issue unit 14 decodes the fetched instructions and queues them in one or more instruction queues for issue to the appropriate execution units. The instructions may be speculatively issued to the appropriate execution units, again prior to execution/resolution of the branch instructions which cause the instructions to be speculative. In some embodiments, out of order execution may be employed (e.g. instructions may be issued in a different order than the program order). In other embodiments, in order execution may be used. However, some speculative issue/execution may still occur between the time that a branch instruction is issued and its result is generated from the execution unit which executes that branch instruction (e.g. the execution unit may have more than one pipeline stage).

The integer execution units 22A–22B are generally capable of handling integer arithmetic/logic operations, shifts, rotates, etc. At least the integer execution unit 22A is configured to execute branch instructions, and in some embodiments both of the integer execution units 22A–22B may handle branch instructions. In one implementation, only the execution unit 22B executes integer multiply and divide instructions although both may handle such instructions in other embodiments. The floating point execution units 24A–24B similarly execute the floating point instructions. The integer and floating point execution units 22A–22B and 24A–24B may read and write operands to and from the register file 28 in the illustrated embodiment, which may include both integer and floating point registers. The load/store units 26A–26B may generate load/store addresses in response to load/store instructions and perform cache accesses to read and write memory locations through the data cache 30 (and through the bus interface unit 32, as needed), transferring data to and from the registers in the register file 28 as well.

The instruction cache 12 may have any suitable configuration and size, including direct mapped, fully associative, and set associative configurations. Similarly, the data cache 30 may have any suitable configuration and size, including any of the above mentioned configurations. In one implementation, each of the instruction cache 12 and the data cache 30 may be 4 way set associative, 32 kilobyte (kb) caches including 32 byte cache lines. Both the instruction cache 12 and the data cache 30 are coupled to the bus interface unit 32 for transferring instructions and data into and out of the caches in response to misses, flushes, coherency activity on the bus, etc.

In one implementation, the processor 10 is designed to the MIPS instruction set architecture (including the MIPS-3D and MIPS MDMX application specific extensions). The MIPS instruction set may be used below as a specific example of certain instructions. However, other embodiments may implement the IA-32 or IA-64 instruction set architectures developed by Intel Corp., the PowerPC instruction set architecture, the Alpha instruction set architecture, the ARM instruction set architecture, or any other instruction set architecture.

It is noted that, while FIG. 1 illustrates two integer execution units, two floating point execution units, and two load/store units, other embodiments may employ any number of each type of unit, and the number of one type may differ from the number of another type.

Cache

Figure 2:
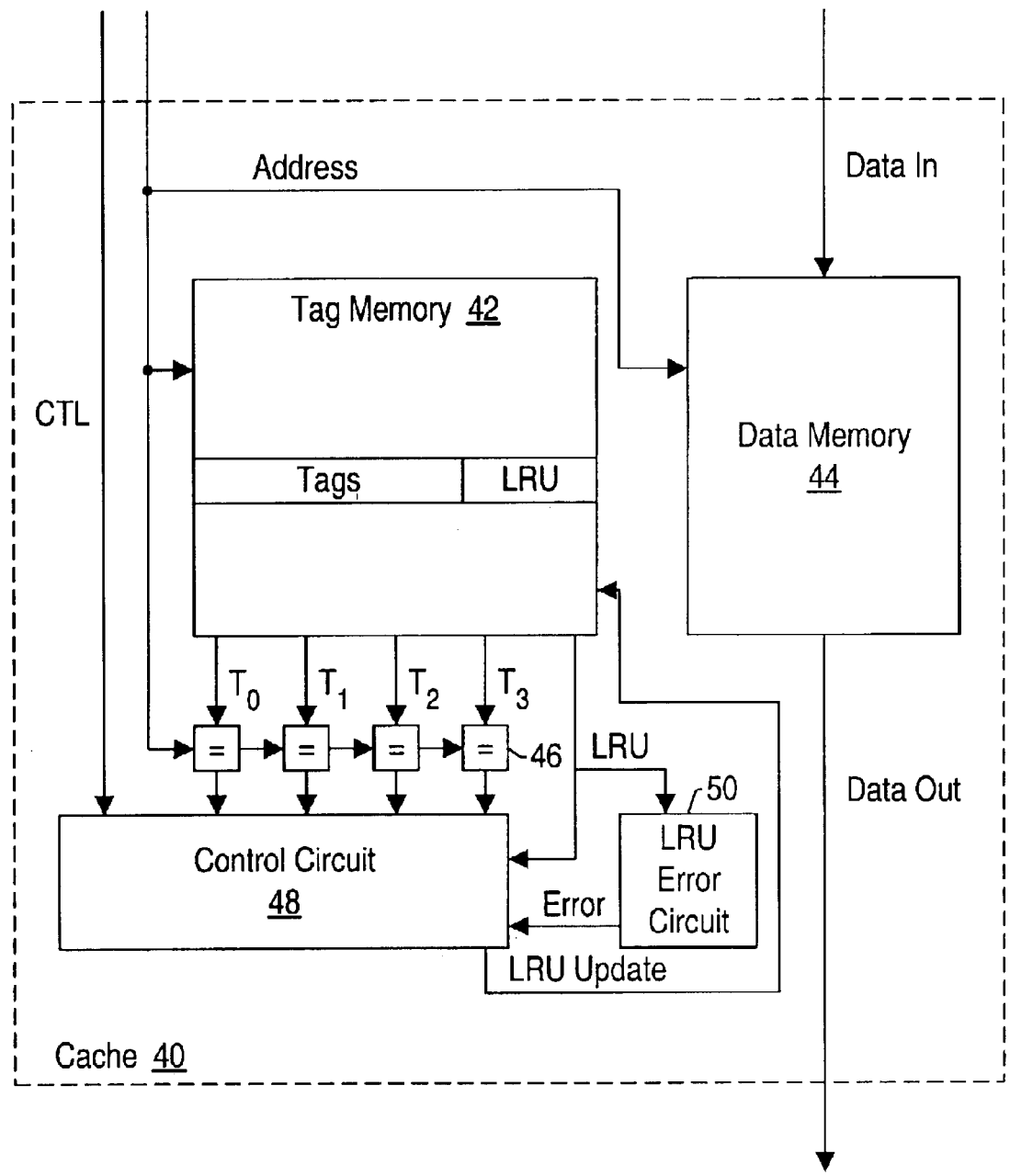
FIG. 2 is a block diagram of one embodiment of a cache.

Turning now to FIG. 2, a block diagram of one embodiment of a cache 40 is shown. Other embodiments are possible and contemplated. In the embodiment of FIG. 2, the cache 40 includes a tag memory 42, a data memory 44, a set of comparators 46, a control circuit 48, and an LRU error circuit 50. The cache 40 is coupled to receive an address for a cache access, as well as input data (data in) if the cache access is a write, and control information indicating the type of access (CTL). Particularly, the tags memory 42 and the data memory 44 may receive a portion of the address as an index, and a tag portion of the address may be provided to the comparators 46. The data memory 44 is coupled to receive the input data and to provide output data (data out). The comparators 46 are coupled to receive respective tags from the tag memory 42 and to provide comparison result signals to the control circuit 48, which is further coupled to receive the control information for the cache access. The control circuit 48 is still further coupled to receive the LRU data from the tag memory 42 and to provide an LRU update to the tag memory 42, and is coupled to receive an error signal from the LRU error circuit 50. The LRU error circuit 50 is coupled to receive the LRU data from the tag memory 42.

Generally, the cache 40 comprises multiple cache entries. Each cache entry may comprise a tag (and associated status information) stored in a location within the tag memory 42 and a data block stored in a location within the data memory 44. In other embodiments, the tag memory 42 and the data memory 44 may be one integrated memory. Generally, as used herein, a cache entry is the storage used to store one cache block of data and corresponding tag/status information. The cache 40 may have any suitable organization of the entries, including set associative and fully associative organizations. The illustrated embodiment may be 4 way set associative, in which 4 cache entries are selected for each index (referred to as a set) and each of the 4 cache entries is referred to as a way of that set.

A portion of the address presented to the cache for an access may be used as an index to select the set. The remaining address bits not included in the index (or the offset within a cache block) are the tag portion of the address, and are compared to the tags stored in the cache entries forming the set. Each of the comparators 46 is coupled to receive one of the tags from the set ($T_0$–$T_3$, as illustrated in FIG. 2) and the tag portion of the input address.

Each of the comparators 46 is coupled to provide an output signal indicating match or mismatch to the control circuit 48. If the tag portion of the input address matches a tag read from the tag memory 42, the access is a hit in the corresponding cache entry. If the tag portion of the input address does not match any tags read from the tag memory 42, the access is a miss in the cache 40. If the access is a hit and is a read, the data is provided from the corresponding location in the data memory 44 (data out). If the access is a hit and is a write, the data is received into the corresponding location in the data memory 44 (data in). The control circuit 48 may include control signals for causing the data memory 44 to output data from or store data into the location corresponding to the hitting cache entry, and may further include control signals for updating tag entries (not shown in FIG. 2).

On the other hand, if the access is a miss in the cache 40, generally the cache 40 selects one of the ways for replacing the cache block stored therein with the cache block corresponding to the access. In the illustrated embodiment, a least recently used (LRU) replacement scheme is used. In the LRU scheme, LRU data is stored for each set which orders the ways from most recently used to least recently used according to the pattern of access to the cache blocks in the set. When a cache block in a given way is accessed, the LRU data is updated to indicate that the given way is most recently used. Additionally, the LRU data is updated to indicate that the way which was previously indicated as being most recently used as second most recently used, etc. through the least recently used way. When a cache miss occurs, the way which is indicated as least recently used is selected for replacement of the cache block stored therein. When the missing cache block is stored into the selected way, the LRU data may be updated to indicate that the selected way is most recently used, etc. Accordingly, the LRU data for the set accessed in response to a given address is read from the tag memory 42 and is provided to the control circuit 48. Additionally, the control circuit 48 may provide an LRU update in response to an access, updating the LRU to indicate that the hitting way is most recently used and adjusting the other values accordingly.

The LRU error circuit 50 is used to check the LRU data read from a set to ensure that the data is not in error. Particularly, the LRU data may be checked to ensure that it represents a valid ordering of the ways from most recently used to least recently used. Depending on the way in which the data is represented, the check may be viewed in a variety of fashions. For example, the data may comprise a separate value corresponding to each way, with the value encoded to indicate that way's current position in between most recently used and least recently used (inclusive). The LRU error circuit 50 may check to ensure that each possible encoding exists across the values within the LRU data. Thus, the LRU error circuit 50 may detect that a different way is indicated at each position between most recently used and least recently used (inclusive). Alternatively, the LRU data could be a list of the ways from most recently used to least recently used. When a way is made most recently used, it could be shifted into the most recently used position of the LRU data and the intervening ways could be shifted down a position until the position previously including that way is reached. In such a case, the LRU data may be checked to ensure that each way is included in one position within the LRU data (or, viewed in another way, that a different way is indicated at each position within the order).

If the LRU data is in error, the LRU error circuit 50 may assert the error signal to the control circuit 48. In response to the signal, the control circuit 48 may update the LRU data to correct the error. In one implementation, the control circuit 48 may update the LRU data to a predetermined, fixed value if an error is detected. Each of the ways may be represented in the fixed value. For example, the LRU data may be set such that way 0 is indicated as most recently used, way 1 as second most recently used, etc. through way N (e.g. way 3 in the illustrated embodiment) being least recently used. Alternatively, way 0 may be indicated as least recently used, way 1 as second least recently used, etc. through way N (e.g. way 3) being most recently used. Any valid LRU data may be supplied.

By correcting the LRU data when it is found to be in error, the loss of use of a way due to the LRU data being in error may be avoided. If the LRU data were in error, it is possible that a particular way would not become least recently used even if not accessed for a long period of time (or at least may not become the least recently used for a long period of time, even if the particular way is storing the least recently used block). Since the data stored in the particular way is not being used, the particular way is effectively lost (at least temporarily), and performance may be reduced due to reduced hit rates. Furthermore, by checking the LRU data directly (e.g. rather than using parity or ECC protection of the LRU data), errors may be detected even if multiple bit errors occur. Thus, the error detection may be more accurate than if parity or ECC protection was used. Finally, since the LRU data may be a relatively small piece of data (e.g. 8 bits for a four way associative cache, 2 bits per way) and thus the inefficiency of storing a parity bit or ECC bits for such a small piece of data may be avoided, as may combining the LRU data with other data (e.g. the tags) for coverage with a parity bit or ECC data.

While the above embodiment uses the LRU replacement mechanism, other embodiments may use any replacement mechanism. For example, a first-in, first-out (FIFO) mechanism could be used in which the replacement data for a set could represent the order that cache blocks originally were allocated into the set, and the oldest-allocated block could be replaced. Additionally, mechanisms which approximate LRU are sometimes implemented. For example, the ways can be divided into groups and LRU may be maintained separately for each group. When a replacement is needed, a group is selected (e.g. using round robin, random selection, etc.) and the LRU way within that group is selected. The LRU error circuit 50 could be used for detecting errors on the LRU data for each group. Furthermore, while the above embodiment is set associative, fully associative embodiments are contemplated in which the replacement data orders all the entries in the cache for replacement purposes. The replacement data in such an embodiment may be LRU data, FIFO data, etc. Furthermore, other embodiments may be set associative but may have more or fewer ways per set.

As used herein, the term "replacement data" refers to data associated with at least two cache entries which can be used to select one of the cache entries for replacement of the cache block stored therein with a cache block being brought into the cache for storage. Each of the cache entries may be represented in the replacement data (e.g. by a dedicated value assigned to that cache entry and encoded to indicate that cache entry's position within the order indicated by the replacement data or by a value indicating that cache entry which is moved about within the replacement data to indicate the position of that cache entry within the order). Viewed in a different way, the replacement data may indicate an order of replacement among the cache entries, and a given cache entry may occupy a position within the order (from first to be replaced to last to be replaced). The data may indicate a different way at each position in the order (if not in error).

In various embodiments, the cache 40 may be employed as the instruction cache 12, the data cache 30, or both. Furthermore, various embodiments may employ the cache 40 as an integrated L2 cache of the processor 10, or as the L2 cache shown in FIG. 5 below. The cache 40 may be used for an level in a cache hierarchy, as desired.

It is noted that, while the LRU data is illustrated stored with each set in the tags memory 42 in FIG. 2, other embodiments may store the LRU data (or other replacement data) separately, in any type of memory. The appropriate LRU data may be selected in response to the address in any fashion (e.g. read from a RAM, muxed from a register, etc.)

Figure 3:
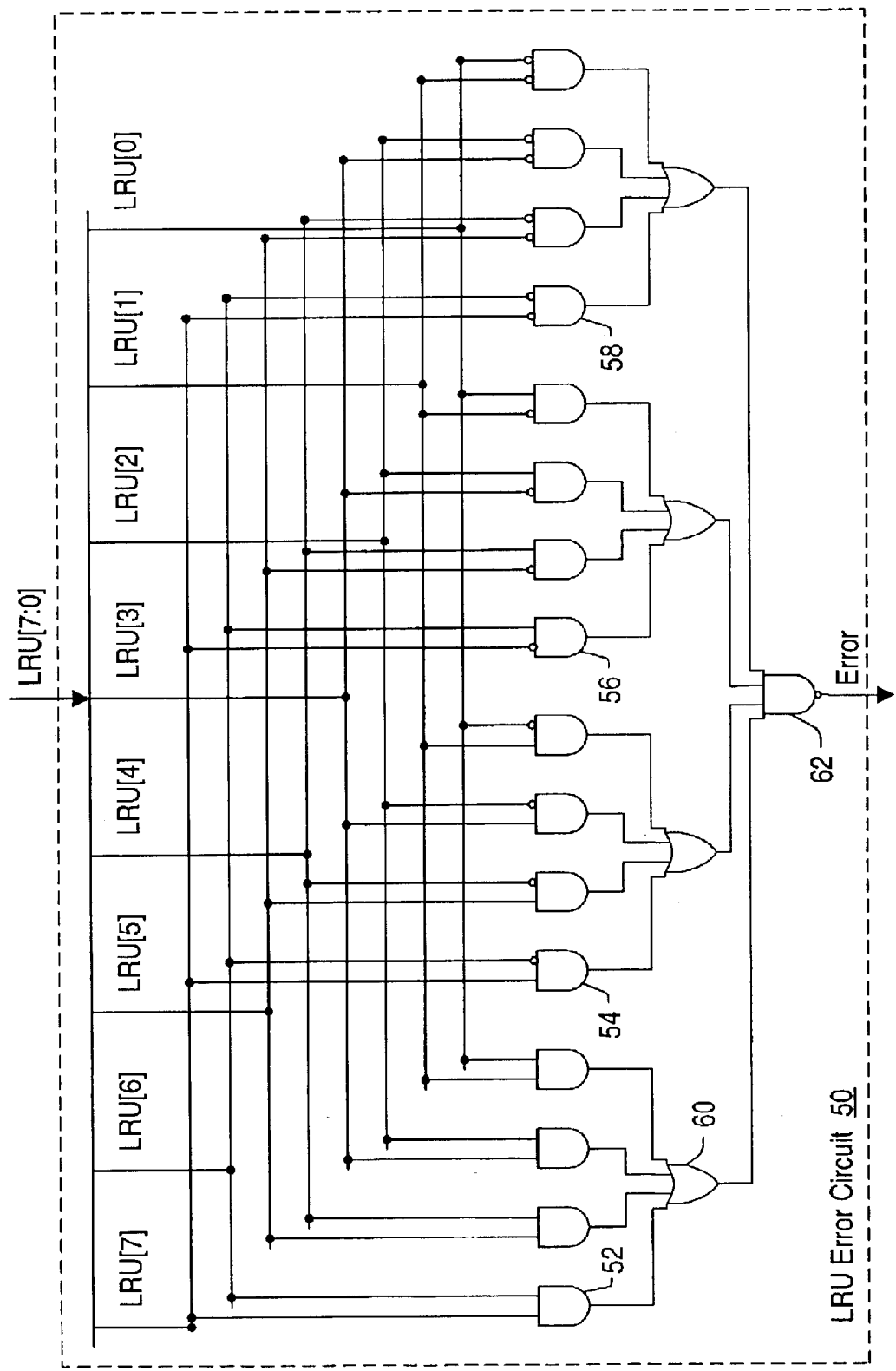
FIG. 3 is a circuit diagram of one embodiment of an LRU error circuit shown in FIG. 1.

Turning now to FIG. 3, a circuit diagram of one embodiment of the LRU error circuit 50 for a 4 way set associative cache is shown. Other embodiments are possible and contemplated.

Generally, the embodiment illustrated in FIG. 3 decodes the values represented in the LRU data to ensure that each possible value is included therein. For example, AND gates 52, 54, 56, and 58 decode the LRU value represented by LRU bits 7:6. The LRU value represented by LRU bits 7:6 may, for example, corresponding to way 0 or way 3. Other bits in the LRU data may correspond to the remaining ways. Depending on the encoding of LRU bits 7:6, one of AND gates 52, 54, 56, and 58 will output a logical one and the remaining gates will output a logical zero. Thus, AND gates 52, 54, 56, and 58 may comprise a decoder for LRU bits 7:6.

The AND gates illustrated in FIG. 3 are grouped according to the value detected for ease of connecting input and output lines in the drawing. Thus, for example, 4 AND gates are shown connected to inputs of the OR gate 60. Each of the AND gates operates on different subsets of the LRU bits (e.g. bits 5:4, 3:2, and 1:0). Since there are no inverting inputs on the AND gates connected to the inputs of the OR gate 60, these AND gates output a logical one if both input bits are a one. Accordingly, the AND gates coupled to the OR gate 60 detect if the encoding '11' exists among any subset of two bits within the LRU bits. If not, then each of the AND gates output a logical zero and thus the output of the OR gate 60 is a logical zero. The NAND gate 62 is coupled to receive the output of the OR gate 60 as an input. If the output of the OR gate 60 is a logical zero, the output of the NAND gate 62 is a logical one (e.g. an error is detected). Similarly, if any of the other OR gates illustrated in FIG. 3 output a logical zero, an error is detected. Each OR gate detects the presence or absence of a different encoding within the LRU bits[7:0].

Thus, the circuit of FIG. 3 can be used to detect an error in either of the LRU representations described above. For example, the LRU data may represent way numbers and the way numbers may be shifted within LRU[7:0] to represent the LRU replacement order, and thus the circuit of FIG. 3 detects a missing way in the LRU data. The LRU data may be separate values for each way, with the encoding of the value indicating the position of that way within the order. Again, each encoding should be represented and thus the circuit of FIG. 3 may detect a missing encoding.

It is noted that, while a specific logic circuit is shown in FIG. 3, any suitable circuit may be used. Specifically, any Boolean equivalents of the circuit may be used. For example, the AND and OR gates shown in FIG. 3 may be replaced by NAND gates. Furthermore, the NAND gate 62 may be replaced by an AND gate and the error signal may be defined to indicate an error when it is low (i.e. at a logical zero).

It is further noted that, while the LRU data is 8 bits divided into two bit subsets, other embodiments may use more or fewer bits, depending on the cache implementation. For example, an eight way set associative cache may have 24 bits of LRU data, 3 bits per way.

Figure 4:
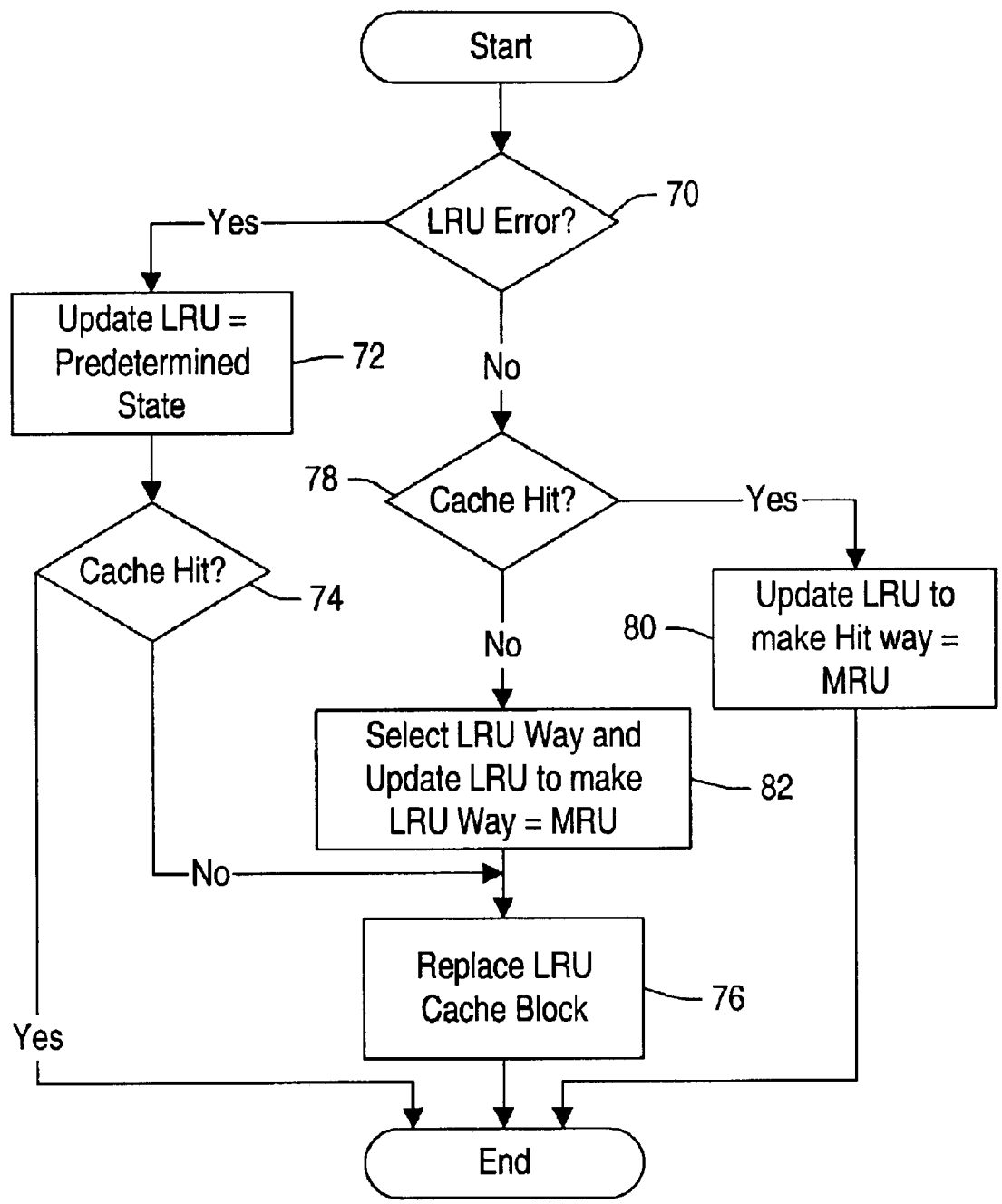
FIG. 4 is a flowchart illustrating operation of one embodiment of a control circuit shown in FIG. 2 for updating LRU replacement data.

Turning now to FIG. 4, a flowchart is shown illustrating operation of one embodiment of the control circuit 48 for updating the LRU data. Other embodiments are possible and contemplated. While the blocks shown in FIG. 4 are illustrated in a particular order for ease of understanding, any order may be used. Furthermore, blocks may be performed in parallel by combinatorial logic circuitry within the control circuit 48. Various blocks may be performed in different clock cycles for the same cache access, as desired.

If the LRU error circuit 50 is indicating an error (decision block 70), the control circuit 48 updates the LRU data to a predetermined state (block 72). If there is a not a cache hit for the access occurring when the error is detected (decision block 74), the LRU way may be selected for replacement of the cache block stored therein (block 76).

On the other hand, if the LRU error circuit 50 is not indicating an error (decision block 70), the control circuit 48 determines if a cache hit is detected from the output signals of the comparators 46 (decision block 78). If there is a cache hit, the control circuit 48 updates the LRU data so that the hit way is indicated as the most recently used (MRU) way (block 80). If there is not a cache hit, the control circuit 48 may select the LRU way based on the LRU data and may update the LRU data to indicate that the LRU way is the MRU way (block 82). The cache block in the LRU way is replaced with the missing cache block (block 76).

System Overview and Carrier Medium

Figure 5:
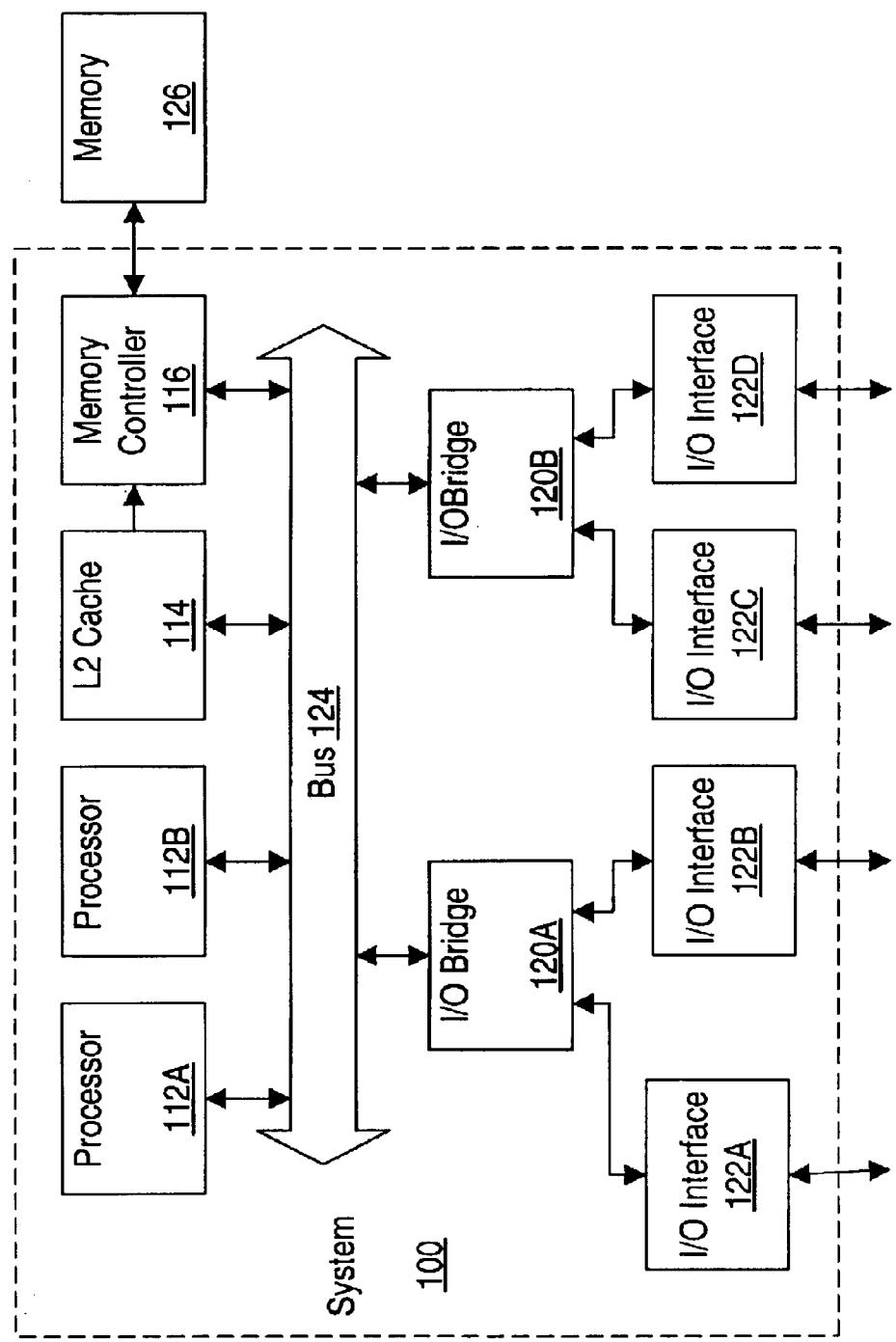
FIG. 5 is a block diagram of one embodiment of a system including the processor shown in FIG. 1 and an L2 cache.

Turning now to FIG. 5, a block diagram of one embodiment of a system 100 is shown. Other embodiments are possible and contemplated. In the embodiment of FIG. 5, system 100 includes processors 112A–112B, an L2 cache 114, a memory controller 116, a pair of input/output (I/O) bridges 120A–120B, and I/O interfaces 122A–122D. System 100 may include a bus 124 for interconnecting the various components of system 100. As illustrated in FIG. 5, each of processors 112A–112B, L2 cache 114, memory controller 116, and I/O bridges 120A–120B are coupled to bus 124. Thus, each of processors 112A–112B, L2 cache 114, memory controller 116, and I/O bridges 120A–120B may be an agent on bus 124 for the illustrated embodiment. I/O bridge 120A is coupled to I/O interfaces 122A–122B, and I/O bridge 120B is coupled to I/O interfaces 122C–122D. L2 cache 114 is coupled to memory controller 116, which is further coupled to a memory 126.

Processors 112A–112B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. While system 100 as shown in FIG. 5 includes two processors, other embodiments may include one processor or more than two processors, as desired. Any of the processors may, for example, be implementations of the processor 10 shown in FIG. 1.

L2 cache 114 is a high speed cache memory. L2 cache 114 is referred to as "L2" since processors 112A–112B may employ internal level 1 ("L1") caches. If L1 caches are not included in processors 112A–112B, L2 cache 114 may be an L1 cache. Furthermore, if multiple levels of caching are included in processors 112A–112B, L2 cache 114 may be an outer level cache than L2. L2 cache 114 may employ any organization, including direct mapped, set associative, and fully associative organizations. In one particular implementation, L2 cache 114 may be a set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected). L2 cache 114 may be an implementation of the cache 40, if desired.

Memory controller 116 is configured to access memory 126 in response to memory transactions received on bus 124. Memory controller 116 receives a hit signal from L2 cache 114, and if a hit is detected in L2 cache 114 for a memory transaction, memory controller 116 does not respond to that memory transaction. Other embodiments may not include L2 cache 114 and memory controller 116 may respond to each memory transaction. If a miss is detected by L2 cache 114, or the memory transaction is non-cacheable, memory controller 116 may access memory 126 to perform the read or write operation. Memory controller 116 may be designed to access any of a variety of types of memory. For example, memory controller 116 may be designed for synchronous dynamic random access memory (SDRAM), and more particularly double data rate (DDR) SDRAM. Alternatively, memory controller 116 may be designed for DRAM, Rambus DRAM (RDRAM), SRAM, or any other suitable memory device.

I/O bridges 120A–120B link one or more I/O interfaces (e.g. I/O interfaces 122A–122B for I/O bridge 120A and I/O interfaces 122C–122D for I/O bridge 120B) to bus 124. I/O bridges 120A–120B may serve to reduce the electrical loading on bus 124 if more than one I/O interface 122A–122B is bridged by that I/O bridge. Generally, I/O bridge 120A performs transactions on bus 124 on behalf of I/O interfaces 122A–122B and relays transactions targeted at an I/O interface 122A–122B from bus 124 to that I/O interface 122A–122B. Similarly, I/O bridge 120B generally performs transactions on bus 124 on behalf of I/O interfaces 122C–122D and relays transactions targeted at an I/O interface 122C–122D from bus 124 to that I/O interface 122C–122D. In one implementation, I/O bridge 120A may be a bridge to a PCI interface (e.g. I/O interface 122A) and to a Lightning Data Transport (LDT) I/O fabric developed by Advanced Micro Devices, Inc. (e.g. I/O interface 122B). Other I/O interfaces may be bridged by I/O bridge 120B. Other implementations may bridge any combination of I/O interfaces using any combination of I/O bridges. I/O interfaces 122A–122D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

Bus 124 may be a split transaction bus, in one embodiment. Bus 124 may employ a distributed arbitration scheme, in one embodiment. In one embodiment, bus 124 may be pipelined. Bus 124 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that system 100 (and more particularly processors 112A–112B, L2 cache 114, memory controller 116, I/O interfaces 122A–122D, I/O bridges 120A–120B and bus 124 may be integrated onto a single integrated circuit as a system on a chip configuration. In another configuration, memory 126 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 124 may not be pipelined, if desired.

It is noted that, while FIG. 5 illustrates I/O interfaces 122A–122D coupled through I/O bridges 120A–120B to bus 124, other embodiments may include one or more I/O interfaces directly coupled to bus 124, if desired.

Figure 6:
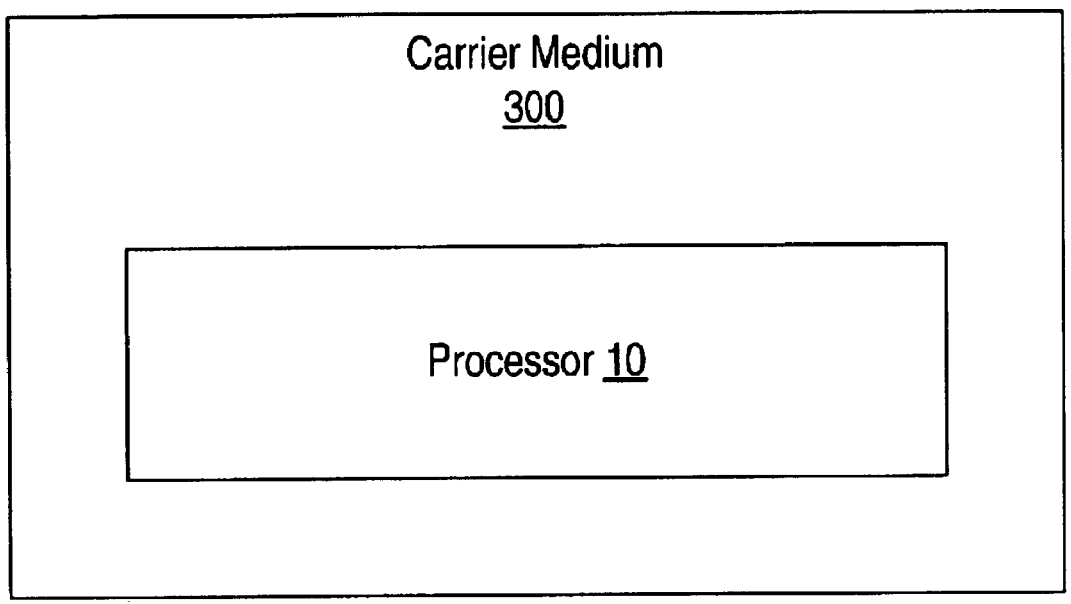
FIG. 6 is a block diagram of one embodiment of a carrier medium.

Turning next to FIG. 6, a block diagram of a carrier medium 300 including a database representative of the processor 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of the processor 10 carried on carrier medium 300 may be a database which can be read by a program and used, directly or indirectly, to fabricate the hardware comprising the processor 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 10. The netlist may then be placed and routed to produce a data set describing geometric shapes to be applied to masks. The masks may then be used in various semiconductor fabrication steps to produce a semiconductor circuit or circuits corresponding to the processor 10. Alternatively, the database on carrier medium 300 may be the netlist (with or without the synthesis library) or the data set, as desired.

While carrier medium 300 carries a representation of the processor 10, other embodiments may carry a representation of any portion of processor 10, as desired, including any cache, LRU error circuit, tags memory, data memory, control circuits, etc. Furthermore, other embodiments may carry a representation of the system 100 or any portion thereof.

Numerous variations and modifications will become apparent to those skilled in the art once the above disclosure is fully appreciated. It is intended that the following claims be interpreted to embrace all such variations and modifications.

What is claimed is:

1. A cache comprising:
   a cache memory configured to store replacement data corresponding to a plurality of cache entries, wherein the replacement data is to be used to determine which entries are to be selected for eviction when a cache miss occurs;
   a first circuit coupled to receive the replacement data from the cache memory, wherein the first circuit is configured to detect a single or multiple bit error in the replacement data; and
   a second circuit coupled to the first circuit to receive an error indicator from the first circuit and to reset the replacement data to remove the bit error.

2. The cache as recited in claim 1 wherein the replacement data is to represent different ways of a set associative cache.

3. The cache as recited in claim 2 wherein the replacement data represent all ways present for the set associative cache.

4. The cache as recited in claim 2 wherein the error indicator indicates that one of the ways is not available for a cache miss eviction due to the bit error.

5. The cache as recited in claim 4 wherein the second circuit resets the replacement data to a predetermined set of values.

6. The cache as recited in claim 2 wherein the replacement data is to be utilized for determination for eviction based on a least recently used algorithm.

7. A method comprising:
   storing replacement data corresponding to a plurality of cache entries of a cache, wherein the replacement data is to be used to determine which ways of a set associative cache is to be selected for eviction when a cache miss occurs;
   detecting a single or multiple bit error in the replacement data; and resetting the replacement data to remove the bit error.

8. The method as recited in claim 7 further comprising generating an error indication responsive to detecting the bit error.

9. The method as recited in claim 8 wherein generating the error indication indicates that one of the ways is not available for a cache miss eviction due to the bit error.

10. The method as recited in claim 8 wherein the resetting resets the replacement data to a predetermined set of values.

11. The method as recited in claim 7 wherein the replacement data is utilized to determine for eviction based on a least recently used algorithm.

12. A carrier medium comprising a database which is operated upon by a program executable on a computer system, the program operating on the database to perform a portion of a process to fabricate an integrated circuit including circuitry described by the database, the circuitry described in the database including a cache comprising:
   a cache memory configured to store replacement data corresponding to a plurality of cache entries, wherein the replacement data is to be used to determine which entries are to be selected for eviction when a cache miss occurs;
   a first circuit coupled to receive the replacement data from the cache memory, wherein the first circuit is configured to detect a single or multiple bit error in the replacement data; and a second circuit coupled to the first circuit to receive an error indicator from the first circuit and to reset the replacement data to remove the bit error.

13. The carrier medium as recited in claim 12 wherein the replacement data is to represent different ways of a set associative cache.

14. The carrier medium as recited in claim 13 wherein the replacement data represent all ways present for the set associative cache.

15. The carrier medium as recited in claim 13 wherein the error indicator indicates that one of the ways is not available for a cache miss eviction due to the bit error.

16. The carrier medium as recited in claim 15 wherein the second circuit resets the replacement data to a predetermined set of values.

17. The carrier medium as recited in claim 13 wherein the replacement data is to be utilized for determination for eviction based on a least recently used algorithm.

* * * * *